(12) United States Patent
Murata et al.

(10) Patent No.: US 10,029,552 B2
(45) Date of Patent: Jul. 24, 2018

(54) REAR-DRIVE ELECTRIC VEHICLE

(71) Applicant: TOYOTA JIDOSHA KABUSHIKI KAISHA, Toyota-shi, Aichi-ken (JP)

(72) Inventors: Shigeaki Murata, Nisshin (JP); Yasuji Nishi, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/835,987

(22) Filed: Dec. 8, 2017

(65) Prior Publication Data

US 2018/0099552 A1    Apr. 12, 2018

Related U.S. Application Data

(62) Division of application No. 15/089,861, filed on Apr. 4, 2016.

(30) Foreign Application Priority Data

Apr. 9, 2015  (JP) .................. 2015-080344

(51) Int. Cl.
*B60K 1/04*    (2006.01)
*B60R 16/04*   (2006.01)
(Continued)

(52) U.S. Cl.
CPC .............. *B60K 1/04* (2013.01); *B60K 1/00* (2013.01); *B60L 11/1881* (2013.01); *B60K 2001/0411* (2013.01); *B60K 2001/0416* (2013.01)

(58) Field of Classification Search
CPC ................... B60K 1/04; B60R 1/04
See application file for complete search history.

(56) References Cited

U.S. PATENT DOCUMENTS

2002/0189873 A1    12/2002    Mizuno
2009/0120703 A1     5/2009    Nagata
(Continued)

FOREIGN PATENT DOCUMENTS

DE    112013000719 T5    11/2014
JP    H07-81429 A         3/1995
(Continued)

OTHER PUBLICATIONS

Notice of Allowance dated Sep. 8, 2017 in related U.S. Appl. No. 15/089,861.

*Primary Examiner* — Bryan A Evans
(74) *Attorney, Agent, or Firm* — Hunton Andrews Kurth LLP

(57) ABSTRACT

A holding mechanism includes: a holding plate capable of holding an electronic device for an electric vehicle; a leg portion supporting two long sides of the holding plate; first and second fixing portions provided in the leg portion and separated from each other in a short direction of the holding plate; and a third fixing portion located at or near one of two sides of the holding plate along the short direction and located higher than the first and second fixing portions, wherein the first and second fixing portions can be respectively fixed to first and second mount parts provided in a vehicle body structural member at a front side of the electric vehicle and separated from each other in a width direction or front-rear direction of the electric vehicle, and the third fixing portion can be fixed to a third mount part provided in the vehicle body structural member.

3 Claims, 14 Drawing Sheets

(51) Int. Cl.
  *B60K 1/00*     (2006.01)
  *B60L 11/18*    (2006.01)

(56) References Cited

U.S. PATENT DOCUMENTS

2014/0367182 A1* 12/2014 Yoshinaga .......... B60L 11/1898
                                                180/68.4
2015/0027796 A1   1/2015 Naito et al.
2015/0291019 A1* 10/2015 Hatta ..................... B60K 11/06
                                                180/68.2

FOREIGN PATENT DOCUMENTS

| JP | H08-164752 A   | 6/1996  |
|----|----------------|---------|
| JP | 2002-370544 A  | 12/2002 |
| JP | 2004-175301 A  | 6/2004  |
| JP | 2007-069801 A  | 3/2007  |
| JP | 2010-252584 A  | 11/2010 |
| JP | 2010-264967 A  | 11/2010 |
| JP | 2011-051379 A  | 3/2011  |
| JP | 2012-081830 A  | 4/2012  |
| JP | 2012-206582 A  | 10/2012 |
| WO | 2011/044964 A1 | 4/2011  |
| WO | 2013/118602 A1 | 8/2013  |
| WO | 2014-069270 A1 | 5/2014  |

\* cited by examiner

US 10,029,552 B2

REAR-DRIVE ELECTRIC VEHICLE

CROSS-REFERENCE TO RELATED APPLICATION

This application is a divisional of application Ser. No. 15/089,861 filed Apr. 4, 2016, which is based upon and claims the benefit of priority of the prior Japanese Patent Application No. 2015-080344, filed on Apr. 9, 2015, the entire contents both of which are incorporated herein by reference.

FIELD OF THE INVENTION

The present invention relates to a holding mechanism, an electric vehicle, a front-drive electric vehicle, and a rear-drive electric vehicle.

BACKGROUND

Japanese Patent Application Publication No. 2010-264967 discloses a technology that converts an existing engine-driven motorcycle into a motor-driven motorcycle.

SUMMARY OF THE INVENTION

It is an object of the present invention to provide a holding mechanism capable of being used in common by vehicle bodies of an FF vehicle and an FR vehicle, to provide an electric vehicle including the holding mechanism, and to provide a front-drive electric vehicle and a rear-drive electric vehicle.

According to an aspect of the present invention, there is provided a holding mechanism including: a holding plate that has a longitudinal direction and a short direction, and is capable of holding an electronic device used in an electric vehicle; a leg portion that supports two long sides of the holding plate; first and second fixing portions that are provided in the leg portion, and are separated from each other in the short direction; and a third fixing portion that is located at or near one of two sides of the holding plate along the short direction, and is located higher than the first and second fixing portions, wherein the first and second fixing portions are capable of being respectively fixed to first and second mount parts that are provided in a vehicle body structural member at a front side of the electric vehicle and are separated from each other in a width direction or a front-rear direction of the electric vehicle, and the third fixing portion is capable of being fixed to a third mount part provided in the vehicle body structural member.

According to another aspect of the present invention, there is provided an electric vehicle including: the above holding mechanism; the electronic device; and the vehicle body structural member to which the holding plate and the leg portion are fixed.

According to another aspect of the present invention, there is provided a front-drive electric vehicle including: a drive motor that drives a vehicle; a power source that supplies electric power to the drive motor; a holding plate that is arranged below the power source, holds the power source, and has an approximate rectangular shape; a leg portion that supports two long sides of the holding plate; first and second fixing portions that are provided in the leg portion, and are separated from each other in a short direction of the holding plate; a third fixing portion that is located at or near one of two sides of the holding plate along the short direction, and is located higher than the first and second fixing portions; a vehicle body structural member; and first and second mount parts and a third mount part provided in the vehicle body structural member; wherein the first and second mount parts are located away from each other in a front-rear direction of the vehicle; the first and second fixing portions are respectively connected to the first and second mount parts, and the third fixing portion is connected to the third mount part.

According to another aspect of the present invention, there is provided a rear-drive electric vehicle including: a drive motor that drives a vehicle; a power source that supplies electric power to the drive motor; a holding plate that is arranged below the power source, holds the power source, and has an approximate rectangular shape; a leg portion that supports two long sides of the holding plate; first and second fixing portions that are provided in the leg portion, and are separated from each other in a short direction of the holding plate; a third fixing portion that is located at or near one of two sides of the holding plate along the short direction, and is located higher than the first and second fixing portions; a vehicle body structural member; and first and second mount parts and a third mount part provided in the vehicle body structural member; wherein the first and second mount parts are located away from each other in a width direction of the vehicle; the first and second fixing portions are respectively connected to the first and second mount parts, and the third fixing portion is connected to the third mount part.

DETAILED DESCRIPTION

For example, a vehicle body of an engine-driven automobile may be used to manufacture a motor-driven electric vehicle. In this case, instead of an engine, electric devices used in an electric vehicle may be installed in the engine room. For example, the electronic devices may be installed while being held by a predetermined holding mechanism.

Here, when an engine automobile has the engine room at the front side of the vehicle, the vehicle body structural member in the engine room has a mount part for mounting the engine. At least a part of the mount part may be used to mount a holding mechanism holding the electronic device to the mount part.

However, the position of the mount part differs between FF (front-engine front-drive) vehicles in which an engine is installed transversely and FR (front-engine rear-drive) vehicles in which an engine is installed vertically.

Thus, when the holding mechanism holding the electronic devices is installed in the engine room of the FF vehicle or the FR vehicle, the holding mechanisms corresponding to the mount parts of the FF vehicle and the FR vehicle need separately manufacturing. In this case, the manufacturing cost may increase.

Hereinafter, a description will be given of embodiments.

First Embodiment

Figure 1:
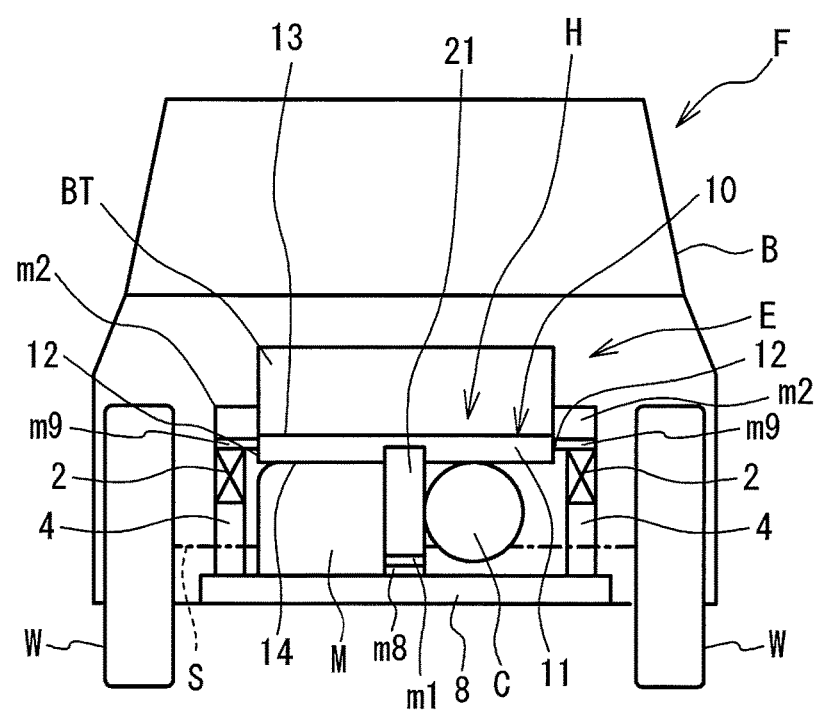
FIG. 1 is a schematic view of the inside of an engine room of an electric vehicle that uses a vehicle body of an FF vehicle.
Figure 2:
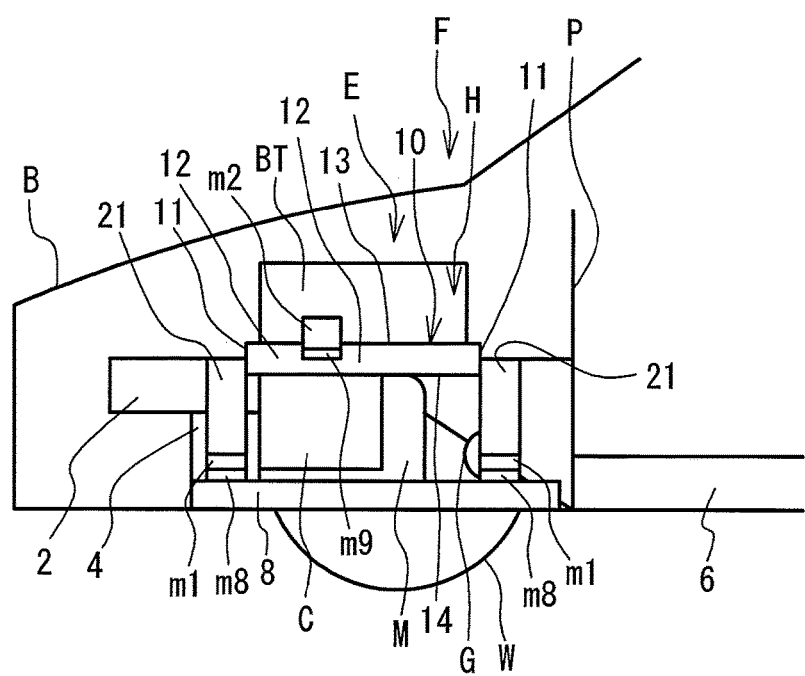
FIG. 2 is a schematic view of the inside of the engine room of the electric vehicle that uses the vehicle body of the FF vehicle.
Figure 3:
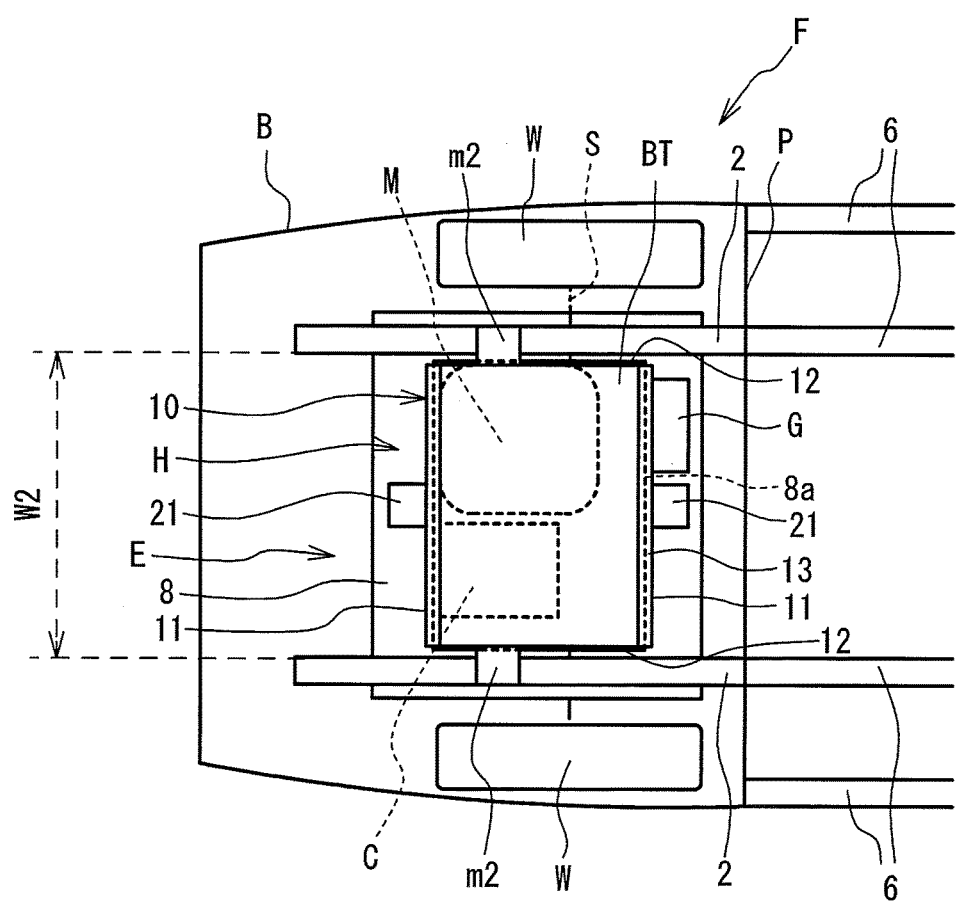
FIG. 3 is a schematic view of the inside of the engine room of the electric vehicle that uses the vehicle body of the FF vehicle.

FIG. 1 through FIG. 3 are schematic views of the inside of an engine room E of an electric vehicle F that uses a vehicle body of an FF vehicle. FIG. 1 illustrates the engine room E viewed from the front side, FIG. 2 illustrates the engine room E viewed from the side, and FIG. 3 illustrates the engine room E viewed from above. The electric vehicle described in the present description is not equipped with an engine, but a space in which an engine is supposed to be installed is referred to as an "engine room" for the convenience sake.

The electric vehicle F is manufactured by using the vehicle body of an engine-driven FF vehicle. The electric vehicle F includes a body B, front side members 2, floor members 6, a front suspension member 8, a fuel cell stack (hereinafter, referred to as a fuel cell) BT, an air compressor C, a motor M, front wheels W, a steering gear box G, and a holding mechanism H. The electric vehicle F also includes an unillustrated tank that stores fuel gas used for power generation of the fuel cell BT.

The air compressor C supplies air used for power generation of the fuel cell BT to the fuel cell BT, and drives by the supply of electric power from the fuel cell BT. The motor M drives the front wheels W via a drive shaft S with electric power of the fuel cell BT to allow the electric vehicle F to run. A transaxle that transmits power to the drive shaft S is integrated with the motor M. The transaxle is a power transmission mechanism including a speed reduction mechanism and a differential mechanism.

The steering gear box G steers left and right front wheels W, and is connected to the knuckle arms of the front wheels W via tie rods not illustrated. The steering gear box G is connected to a steering wheel not illustrated via a steering shaft. The operation force of the steering wheel by a driver is transmitted to the steering gear box G via the steering shaft, and then transmitted to the front wheels W as a steering force after an assist force is added by the steering gear box G. The steering gear box G may give a steering force to the left and right front wheels W based on the electric signals generated by the steering of the steering wheel.

The front side members 2, the floor members 6, the front suspension member 8, and a dash panel P are made from metal, and each of them is a part of the vehicle body structural member of the electric vehicle F. The front side members 2 are arranged at the right and the left of the electric vehicle F, and extend in the front-rear direction of the vehicle. Posts 4 extending in the vertical direction are fixed to the tips of the front side members 2, and the front suspension member 8 is suspended via the posts 4. The front suspension member 8 is shaped into a frame having an opening 8a, and supports an unillustrated suspension for the front wheels W. The steering gear box G is fixed to the front suspension member 8, and located closer to the rear side of the vehicle than to the center of the opening 8a.

The engine room E is located at the front side of the electric vehicle F, and more specifically, is located anterior to the dash panel P that defines a passenger compartment and above the front suspension member 8. In the electric vehicle F, instead of an engine, the fuel cell BT, the motor M, and the air compressor C are arranged in the engine room E. Although the specifics will be described later, the fuel cell BT, the motor M, and the air compressor C are held by the holding mechanism H, and the holding mechanism H is installed in the engine room E. The fuel cell BT, the motor M, and the air compressor C are examples of electronic devices used in an electric vehicle, and are also examples of accessories supplied with electric power from the fuel cell BT.

The holding mechanism H includes a holding plate 10. To the holding plate 10, mounted are two leg portions 21 that support the holding plate 10 at a predetermined height position and are fixed to the front suspension member 8. The holding plate 10 and the leg portions 21 are made from metal. The holding plate 10 has an approximate rectangular shape, and has two long sides 11 facing each other, two short sides 12 facing each other, an upper surface 13, and a lower surface 14. The holding plate 10 is approximately horizontally arranged, and is arranged so that the long sides 11 correspond to the width direction of the vehicle. That is to say, the longitudinal direction of the holding plate 10 corresponds to the width direction of the vehicle, and the short direction of the holding plate 10 corresponds to the front-rear direction of the vehicle.

The fuel cell BT is fixed on the upper surface 13 of the holding plate 10. The motor M and the air compressor C are fixed on the lower surface 14. The fuel cell BT is also shaped into an approximate rectangular shape as viewed from above as with the holding plate 10, and the longitudinal directions of the fuel cell BT and the holding plate 10 are parallel to each other, and the short directions thereof are parallel to each other.

The leg portions 21 extend in a direction intersecting with the direction of the planar surface of the holding plate 10, more specifically, in a vertically downward direction. The upper end of each of the two leg portions 21 is mounted to the approximate center of the corresponding one of the two long sides 11 by a screw or a bolt. The leg portions 21 may be mounted to the holding plate 10 by welding. The two leg portions 21 are aligned in the short direction of the holding plate 10. A fixing portion m1 is mounted to the lower end of the leg portion 21. Accordingly, two fixing portions m1 are separated from each other in the short direction of the holding plate 10, and are located at the sides of the two long sides 11 as viewed from the upper surface 13.

The front suspension member 8 has two mount parts m8 that are separated from each other across the opening 8a in the front-rear direction of the vehicle. When the fixing portions m1 are mounted to the mount parts m8, the leg portions 21 are fixed to the front suspension member 8. Accordingly, the two fixing portions m1 are fixed to the two mount parts m8 while being separated from each other in the front-rear direction of the vehicle. The two mount parts m8 are examples of first and second mount parts that are provided in a vehicle body structural member at the front side of the electric vehicle F and are separated from each other in the front-rear direction of the electric vehicle F. The two fixing portions m1 are examples of first and second fixing portions that are provided in the leg portions, are separated from each other in the short direction, and are capable of being respectively fixed to the first and second mount parts.

Fixing portions m2 are fixed to the two short sides 12 of the holding plate 10. Accordingly, the two fixing portions m2 are separated from each other in the longitudinal direction of the holding plate 10, i.e., in the width direction of the electric vehicle F, and are located at the sides of the short sides 12 as viewed from the upper surface 13 side. The fixing portions m1 and m2 are separated from each other in the planar surface direction of the holding plate 10. The fixing portions m2 are located higher than the fixing portions m1.

A mount part m9 is located on each of the front side members 2. The fixing portion m2 is mounted to the front side member 2 via the mount part m9, and the holding plate 10 is supported also by the front side members 2. Accordingly, the two fixing portions m2 are examples of third and fourth fixing portions that are located higher than the first and second fixing portions, located at or near the two short sides 12, and is capable of being mounted to the vehicle body structural member of the electric vehicle. The above-described mount parts m8 and m9 are provided for installing an engine in the engine room E.

As described above, the holding plate 10 is supported at a predetermined height position with respect to the front suspension member 8 by the leg portions 21 and the fixing portions m1 and m2. Thus, not only the upper surface 13 but also the lower surface 14 of the holding plate 10 can hold electronic devices such as the air compressor C and the motor M. Therefore, the space in the engine room E in the vertical direction can be efficiently used. In addition, the holding plate 10 is inhibited from interfering with the steering gear box G fixed to the front suspension member 8. In FIG. 1 and FIG. 2, the lower end of the motor M seems to contact the front suspension member 8, but the lower end of the motor M is positioned in the opening 8a in FIG. 3 in practice.

Figure 4:
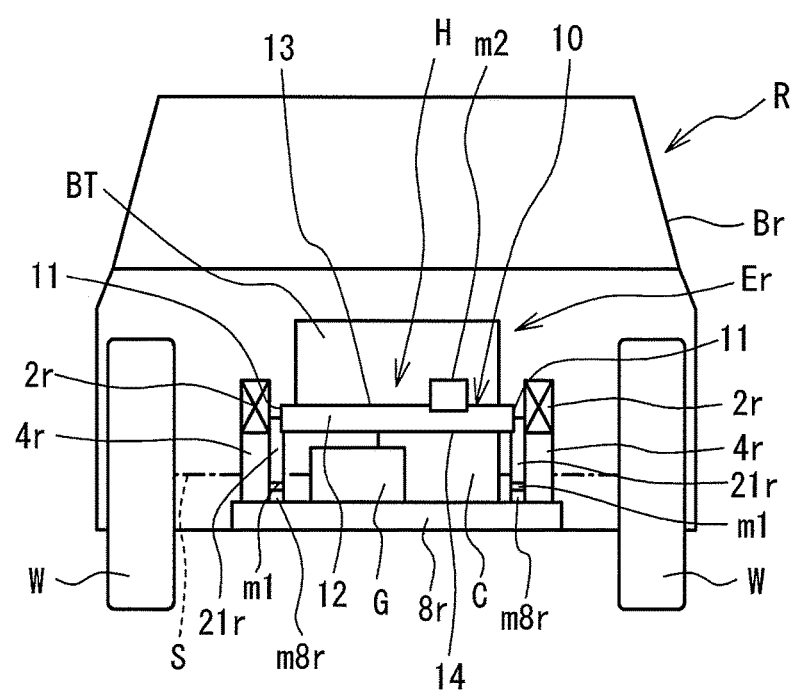
FIG. 4 is a schematic view of the inside of an engine room of an electric vehicle that uses a vehicle body of an FR vehicle.
Figure 5:
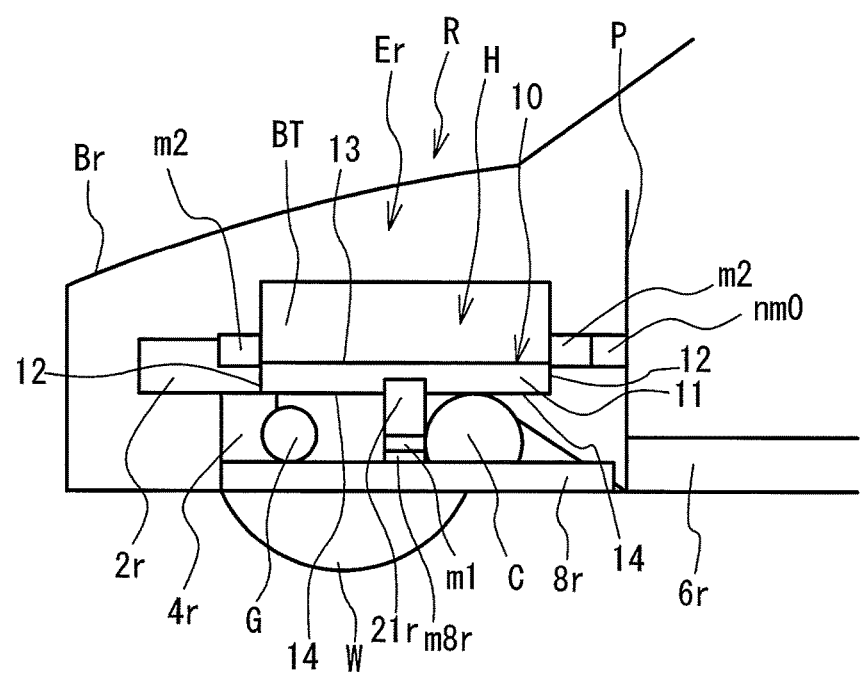
FIG. 5 is a schematic view of the inside of the engine room of the electric vehicle that uses the vehicle body of the FR vehicle.
Figure 6:
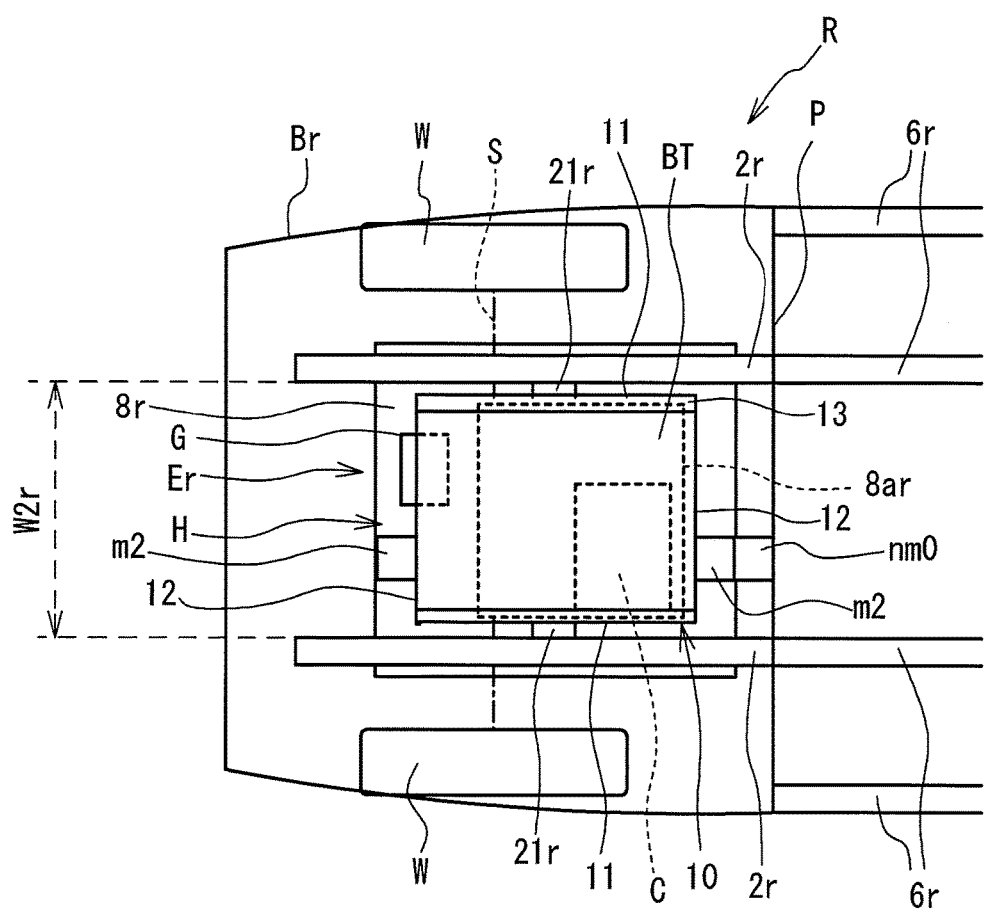
FIG. 6 is a schematic view of the inside of the engine room of the electric vehicle that uses the vehicle body of the FR vehicle.

A description will next be given of the holding mechanism H installed in an electric vehicle R that uses the vehicle body of an FR vehicle. FIG. 4 through FIG. 6 are schematic views of the inside of an engine room Er of the electric vehicle R that uses the vehicle body of an FR vehicle. FIG. 4 through FIG. 6 respectively correspond to FIG. 1 through FIG. 3. The same reference numerals are affixed to the components same as those of the electric vehicle F to omit the overlapping description.

The electric vehicle R is manufactured with use of the vehicle body of an engine-driven FR vehicle. A body Br of the FR vehicle differs from the body B of the FF vehicle in shape, and the front side members 2r and 2, the floor members 6r and 6, and the posts 4r and 4 differ from each other. Moreover, the engine room Er is smaller than the engine room E of the FF vehicle in the vertical direction. The reason is because the transmission is also arranged in the engine room E in the FF vehicle of an engine automobile, whereas the transmission is arranged in the midsection of the vehicle in the FR vehicle. In the electric vehicle R, a motor for driving is not arranged in the engine room Er, and is arranged at the rear side of the vehicle.

In the electric vehicle R, the holding mechanism H does not hold the motor M, and holds the fuel cell BT and the air compressor C. In addition, the holding plate 10 is supported at a predetermined height position by, instead of the leg portion 21, leg portions 21r that are shorter than the leg portions 21. Accordingly, the holding plate 10 in the electric vehicle R is supported at a position lower than the position of the holding plate 10 in the electric vehicle F. The two fixing portions m1 mounted to the lower ends of the leg portions 21r are fixed to two mount parts m8r on a front suspension member 8r. The two mount parts m8r are separated from each other across an opening 8ar of the front suspension member 8r in the width direction of the vehicle. The two mount parts m8r are examples of first and second mount parts that are provided in the vehicle body structural member at the front side of the electric vehicle R and are separated from each other in the width direction of the electric vehicle R.

In the engine room Er, a new mount part nm0 is mounted to the front side of the dash panel P. One of the fixing portions m2, i.e., the fixing portion m2 at the rear side of the vehicle is fixed to the new mount part nm0. The new mount part nm0 is newly provided for installing the holding mechanism H in the engine room Er of the electric vehicle R. As described above, the holding plate 10 is fixed to the dash panel P, which is a vehicle body structural member, via the fixing portion m2 and the new mount part nm0. The other of the fixing portions m2 located at the front side of the vehicle is not fixed to any mount part, and is not utilized. As described above, two fixing portions m1 and one fixing portion m2 stably install the holding mechanism H in the engine room Er. The fixing portion m2 located at the rear side of the vehicle is an example of the above-described third fixing portion.

As described above, the holding plate 10 of the electric vehicle R is also supported at a predetermined height position. Thus, the upper surface 13 and the lower surface 14 can hold electronic devices. Therefore, the space in the engine room Er in the vertical direction is efficiently used. In addition, the holding plate 10 is inhibited from interfering with the steering gear box G fixed to the front suspension member 8r.

Unlike the engine room E, in the engine room Er, the long sides 11 of the holding plate 10 are arranged in the front-rear direction of the vehicle, and the short sides 12 of the holding plate 10 are arranged in the width direction of the vehicle. That is to say, the direction of the holding plate 10 in the electric vehicle R corresponds to a direction of the holding plate 10 rotated by 90 degrees around the vertical line in the electric vehicle F. The reason why the holding plate 10 is installed in a different direction is to inhibit the holding plate 10 from interfering with the front side members 2r because a width W2r between the front side members 2r in the electric vehicle R is less than a width W2 between the front side members 2 in the electric vehicle F as illustrated in FIG. 3 and FIG. 6.

Additionally, the holding plate 10 is supported by the leg portions 21 in the electric vehicle F, whereas the holding plate 10 is supported by the leg portions 21r shorter than the leg portions 21 in the electric vehicle R. As described above, in consideration of the dimensions of the engine rooms E and Er, the difference between the widths W2 and W2r of the front side members 2 and 2r, the optimal leg portion is selected to install the holding plate 10 in the vehicle bodies of the FF vehicle and the FR vehicle.

In addition, unlike the mount parts m8 of the electric vehicle F, the two mount parts m8r of the electric vehicle R are separated from each other in the width direction of the vehicle. In accordance with this configuration, the holding plate 10 is installed in the engine room Er so that the fixing portions m1 provided in the two leg portions 21r are aligned in the width direction of the vehicle. In addition, unlike the electric vehicle F, the steering gear box G of the electric vehicle R is located closer to the front side of the vehicle than to the center of the opening 8ar.

The following will describe a reason why the mount parts m8 of the electric vehicle F are aligned in the front-rear direction of the vehicle, whereas the mount parts m8r of the electric vehicle R are aligned in the width direction of the vehicle. In the FF vehicle in which an engine is installed transversely, the direction of the crankshaft corresponds to the width direction of the vehicle, and thus the rotation of the crankshaft easily applies a force that inclines the engine in the front-rear direction of the vehicle to the engine. To prevent the inclination of the engine, in the FF vehicle, mount parts used to fix the engine are preferably aligned in at least the front-rear direction of the vehicle. In contrast, in the FR vehicle in which an engine is installed vertically, the direction of the crankshaft corresponds to the front-rear direction of the vehicle, and a force that inclines the engine in the width direction of the vehicle is easily applied to the engine. Thus, in the FR vehicle, mount parts used to fix the engine are preferably aligned in at least the width direction of the vehicle.

As described above, the direction of the holding mechanism H is changed so that two fixing portions m1 are separated from each other in the front-rear direction of the vehicle or in the width direction of the vehicle so as to correspond to the positions of the mount parts, and each of the fixing portions m1 and m2 is then fixed to the corresponding mount part. This configuration allows the holding mechanism H to be installed in any of the engine rooms E and Er, and allows the holding mechanism H to be used in common by the vehicle bodies of the FF vehicle and the FR vehicle. Additionally, the step of mounting the fuel cell BT and the air compressor C to the holding mechanism H is common in the manufacturing processes of the electric vehicles F and R. Thus, the manufacturing cost is reduced compared to a case where the holding mechanisms having the above configuration are separately manufactured for an FF vehicle and an FR vehicle to manufacture electric vehicles.

Moreover, the holding mechanism H holding the fuel cell BT and the air compressor C, which are electronic devices, is installed in the engine room E or Er. Thus, the workability is improved compared to a case where the electronic devices are separately installed in the engine room E or Er.

The position of the air compressor C relative to the holding plate 10 is the same between the case where the holding mechanism H is installed in the engine room E and the case where the holding mechanism H is installed in the engine room Er. That is to say, the air compressor C is deviated from the center of the holding plate 10, and is closer to one of the two short sides 12 and closer to one of the two long sides 11 as viewed from the upper surface 13 as illustrated in FIG. 3 and FIG. 6. Here, the steering gear box G is arranged at the rear side in the engine room E, and is arranged at the front side in the engine room Er. However, in any of cases, the steering gear box G is located closer to the other of the two short sides 12 of the holding plate 10 and closer to the other of the two long sides 11 of the holding plate 10. As described above, the air compressor C is held at one side of the lower surface 14 of the holding plate 10, whereas the steering gear box G is arranged below another side of the lower surface 14. Accordingly, in any of the cases where the holding mechanism H is installed in the engine room E or Er, the interference between the air compressor C and the steering gear box G is prevented.

The work of making the holding plate 10 hold the fuel cell BT and the air compressor C can be carried out in a wide work space before the holding mechanism H is installed in the engine room E or Er. Accordingly, the workability is improved compared to a case where the electronic devices are separately installed in the narrow engine room E or Er.

The single holding plate 10 holds the fuel cell BT and the air compressor C, thereby improving the workability of connecting wiring lines between electronic devices. The wiring workability is improved because a wiring line can be placed between the two leg portions 21.

The long side 11 of the holding plate 10 is configured to be as long as possible within a range equal to or less than the width W2 between the front side members 2 of the electric vehicle F, and the short side 12 is configured to be as long as possible within a range equal to or less than the width W2r between the front side members 2r of the electric vehicle R. Thus, the holding plate 10 is inhibited from interfering with the front side members 2 and 2r, and the area of the holding plate 10 for fixing electronic devices is reserved. This configuration enables to stably support the fuel cell BT, which is relatively large.

The holding plate 10 is made from metal having a stiffness capable of holding electronic devices on both the upper surface 13 and the lower surface 14. Thus, the damage to the fuel cell BT due to, for example, the front collision is reduced.

In addition, two or more electronic devices are installed in the engine room E by two fixing portions m1 and two fixing portions m2, and two or more electronic devices are installed in the engine room Er by two fixing portions m1 and one fixing portion m2. Accordingly, the increase in the number of fixing portions is reduced compared to the case where electronic devices are separately installed in the engine rooms E and Er, and the decrease in space efficiency in the engine rooms E and Er is inhibited.

In FIG. 6, as long as the air compressor C does not interfere with any other member, the direction of the holding plate 10 may be rotated by 180 degrees around the vertical line so that the air compressor C is arranged at the front side of the vehicle. In FIG. 1, in accordance with the position of the steering gear box G, the motor M may be held at the right side, and the air compressor C may be held at the left side. In FIG. 1, the holding mechanism that is modified so that the motor M is held at the right side and the air compressor C is held at the left side may be rotated by +90 degrees or −90 degrees around the vertical line and then installed in the electric vehicle R.

Figure 7:
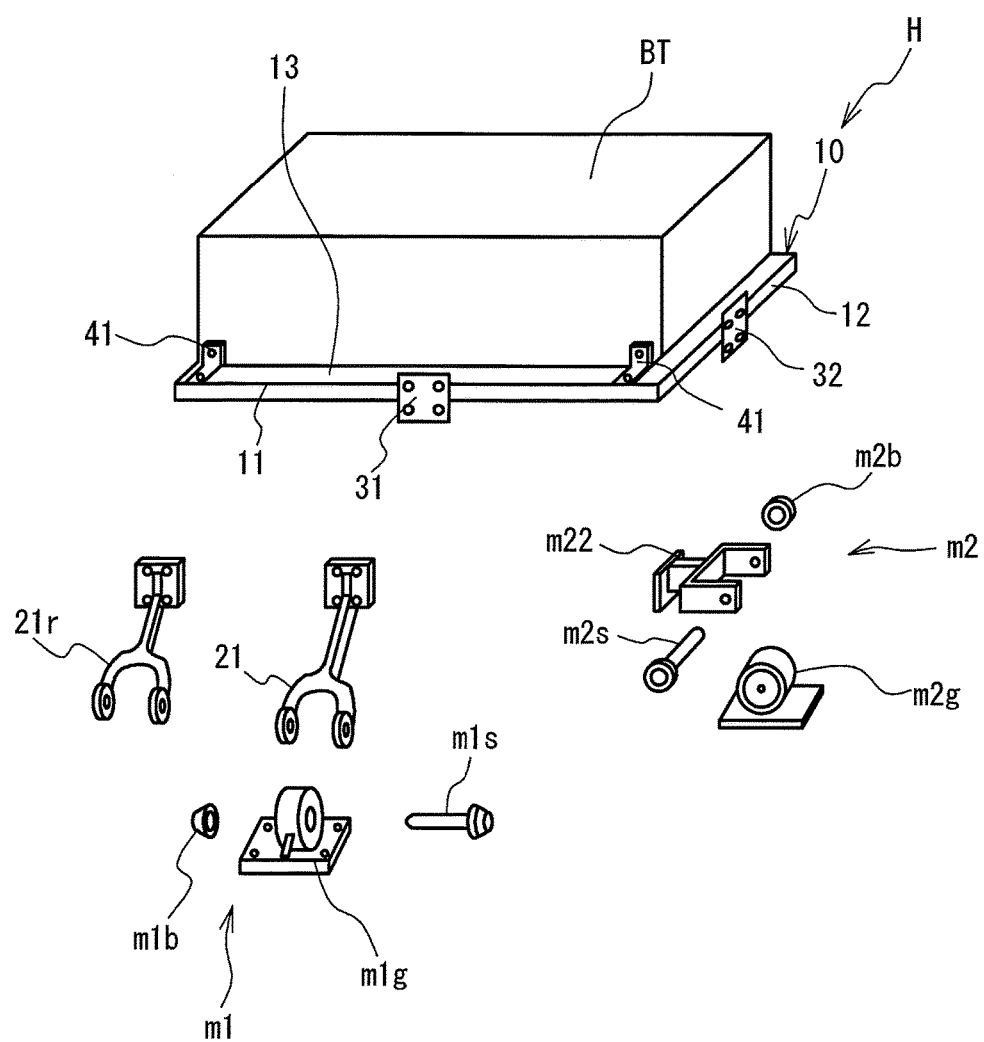
FIG. 7 illustrates a holding mechanism.

FIG. 7 illustrates an example of the holding mechanism H. In FIG. 7, the fuel cell BT is illustrated, but the air compressor C and the motor M are not illustrated. A flat mounting bracket 31 is fixed to the long side 11 of the holding plate 10, and a flat mounting bracket 32 is fixed to the short side 12. The fixing portion m1 includes a mount insulator m1g, and a screw m1s and a bolt m1b used to fix the mount insulator m1g to the lower end of the leg portion 21 or 21r. The upper end of the leg portion 21, 21r is fixed to the mounting bracket 31, and the mount insulator m1g is fixed to the lower end of the leg portion 21, 21r.

The fixing portion m2 includes a mounting bracket m22 and a mount insulator m2g. A mounting bracket m22 shorter than the leg portions 21 and 21r is fixed to the mounting bracket 32, and the mount insulator m2g is fixed to the mounting bracket m22 by a screw m2s and a bolt m2b. The same applies to the other leg portion 21 and the other fixing portion m2 not illustrated in FIG. 7. The fuel cell BT is fixed to the long side 11 of the holding plate 10 by, for example, L-shaped metal fittings 41. The motor M and the air compressor C are fixed to the holding plate 10 by, for example, a metal fitting, a bolt, a nut, a screw, or a bracket.

As illustrated in FIG. 7, the holding plate 10 can be installed in the electric vehicle R by mounting, instead of the leg portion 21, the leg portion 21r shorter than the leg portion 21 to the mounting bracket 31. Such a small amount of work enables the holding mechanism H to be used in common by the FF vehicle and the FR vehicle.

The position of the leg portion 21 relative to the holding plate 10 may differ from the position of the leg portion 21r. In this case, at least two leg portions 21 or at least two leg portions 21r are required to be mounted to the two long sides 11 of the holding plate 10. The leg portions 21 and 21r do not have to be mounted to the center of the long side 11 of the holding plate 10 in the longitudinal direction. The holding mechanism H installed in the electric vehicle R may hold a motor for driving. The fixing portion m2 is required to be located closer to one of the short sides 12 than to the center of the holding plate 10, and to be located closer to the one of the short sides 12 than to one of the long sides 11.

Second Embodiment

Figure 8:
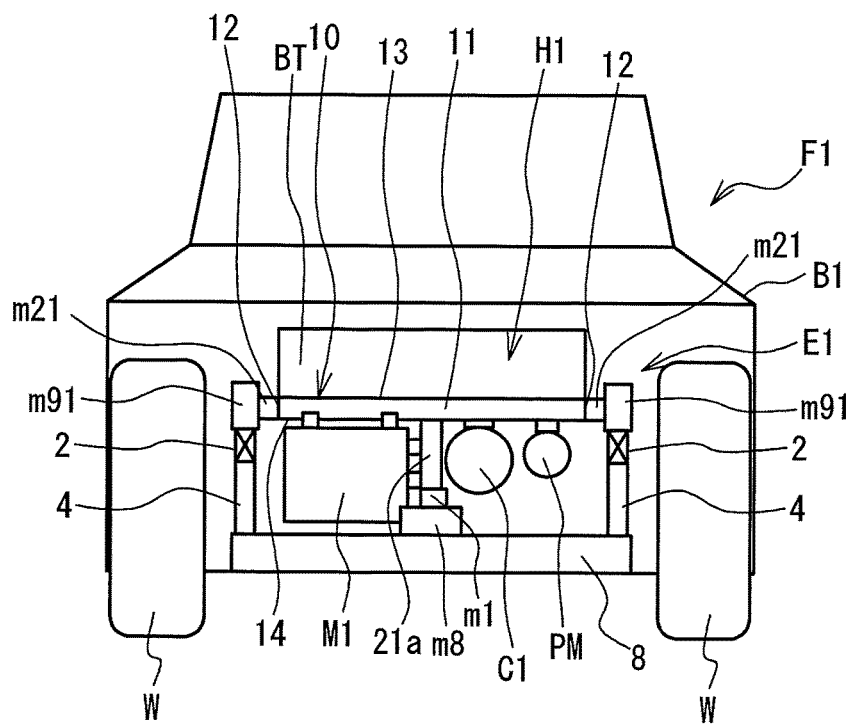
FIG. 8 is a schematic view of the inside of an engine room of an electric vehicle equipped with a holding mechanism of a second embodiment.
Figure 9:
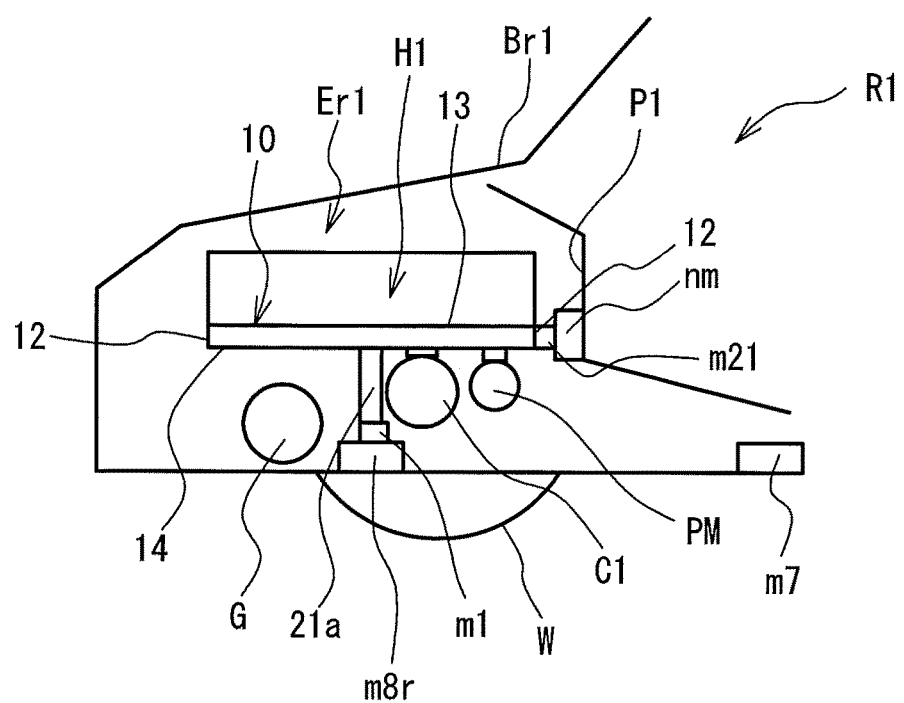
FIG. 9 is a schematic view of the inside of the engine room of the electric vehicle equipped with the holding mechanism of the second embodiment.
Figure 10:
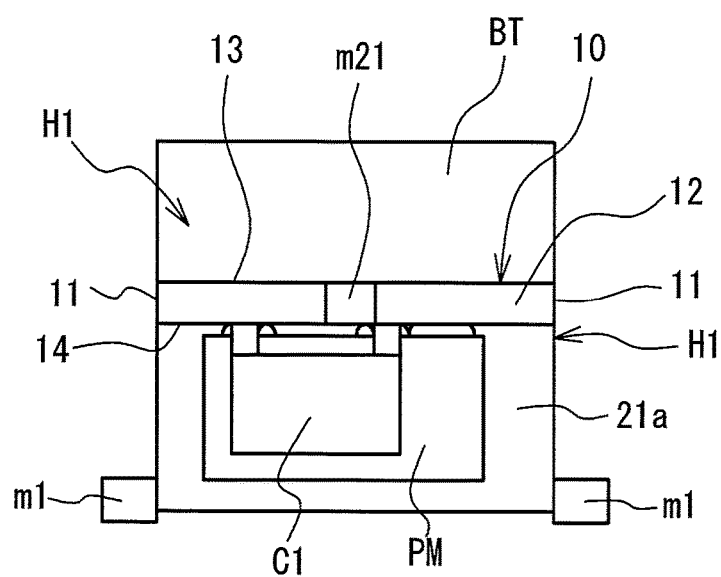
FIG. 10 is a diagram illustrating the holding mechanism of the second embodiment viewed from the longitudinal direction of a holding plate.

A description will next be given of a holding mechanism of a second embodiment. FIG. 8 is a schematic view of the inside of an engine room E1 of an electric vehicle F1 equipped with a holding mechanism H1 of the second embodiment. FIG. 9 is a schematic view of the inside of an engine room Er1 of an electric vehicle R1 equipped with the holding mechanism H1. The same reference numerals are affixed to the components same as those of the first embodiment to omit the overlapping description. In FIG. 9, the front suspension member and the front side members are not illustrated. FIG. 10 illustrates the holding mechanism H1 of the second embodiment viewed from the longitudinal direction of the holding plate 10. As with the first embodiment, the engine room E1 is located at the front side of a body B1, and the engine room Er1 is located at the front side of a body Br1. The electric vehicle F1 is manufactured with use of the vehicle body of an FF vehicle, and the electric vehicle R1 is manufactured with use of the vehicle body of an FR vehicle.

As illustrated in FIG. 10, a leg portion 21a is shaped into a single plate, and fixed to the approximate middle of the lower surface 14 of the holding plate 10 so as to be perpendicular to the lower surface 14. In addition, the plate-like leg portion 21a is mounted to the holding plate 10 so as to intersect with the longitudinal direction of the holding plate 10 and extend in the short direction of the holding plate 10. The two fixing portions m1 are mounted at both sides of the lower end portion of the leg portion 21a in the short direction of the holding plate 10 so as to be separated from each other in the short direction. Fixing portions m21 that are separated from each other in the longitudinal direction of the holding plate 10 are mounted to the two short sides 12 of the holding plate 10.

The holding plate 10 holds an air compressor C1 smaller than the above-described air compressor C, and a pump PM. The pump PM is used to circulate a coolant that cools the fuel cell BT, and drives with electric power from the fuel cell BT. In the holding mechanism H1 of the present embodiment, the single holding plate 10 and the leg portion 21a are installed in both the electric vehicles F1 and R1.

As illustrated in FIG. 8, the holding mechanism H1 is installed in the engine room E1 so that the longitudinal direction of the holding plate 10 corresponds to the width direction of the vehicle. More specifically, the fixing portions m1 are fixed to the mount parts m8 on the front suspension member 8, and the fixing portions m21 are fixed to mount parts m91 mounted to the front side members 2. This configuration allows the holding plate 10 to be supported at a predetermined height position. In the holding mechanism H1 installed in the electric vehicle F1, a motor M1 smaller than the above-described motor M is held by the holding plate 10.

As illustrated in FIG. 9, the holding mechanism H1 is installed in the engine room Er1 so that the longitudinal direction of the holding plate 10 corresponds to the front-rear direction of the vehicle. More specifically, the fixing portions m1 are fixed to the mount parts m8r on the front suspension member, the holding plate 10 is supported at a predetermined height position, and the holding plate 10 does not interfere with the steering gear box G.

In the holding mechanism H1 illustrated in FIG. 9, the fixing portion m21 is mounted to the short side 12 at the rear side of the vehicle, and the new mount part nm is mounted to the front side of a dash panel P1. As described above, the holding plate 10 is fixed to the dash panel P1, which is a vehicle body structural member, via the fixing portion m12 and the new mount part nm.

As described above, in the electric vehicle R1, the holding mechanism H1 is stably installed in the engine room Er1 at three positions in total. The fixing portion m21 is not mounted to the short side 12 at the front side of the vehicle of the holding plate 10, but may be mounted. In the electric vehicle R1, a mount part m7 of the mount parts m8r and m7, which are preliminarily provided in the vehicle body for installing an engine, is not utilized. As described above, it is not necessary to use all the mounting parts preliminarily provided in the vehicle body for installing an engine. The mount part m7 is provided in, for example, a side member.

The leg portion 21a of the holding mechanism H1 is shaped into a single plate. Thus, when the holding mechanism H1 is installed in the direction illustrated in FIG. 9, the leg portion 21a is located anterior to the air compressor C1 and the pump PM in the vehicle. Accordingly, the leg portion 21a can reduce the damage to the air compressor C1 or the pump PM when the front collision occurs.

As illustrated in FIG. 8 and FIG. 9, the holding mechanism H1 uses not only the holding plate 10 but also the leg portion 21a in common between the electric vehicles F1 and R1. Thus, it is not necessary to prepare the different leg portions for the electric vehicles F1 and R1. Therefore, the manufacturing cost of the electric vehicle F1 and R1 is reduced. The fixing portions m1 and m21 are also used in common by the electric vehicles F1 and R1. Thus, the increase in manufacturing cost of the holding mechanism H1 is reduced. Stable installation of the holding mechanism H1 into the electric vehicle R1 becomes possible by the minimal work to a vehicle that provides the new mount part nm to the electric vehicle R1.

In the holding mechanism H1 illustrated in FIG. 8, FIG. 9, and FIG. 10, the holding plate 10 is separate from the leg portion 21a, but may be integrally formed with the leg portion 21a by, for example, casting. The plate-like leg portion 21a may be shaped into a frame by providing a clearance hole or the like. In this case, the provision of the clearance hole improves the degree of freedom in the position of the electric device such as the air compressor C1 that is held at the lower surface 14 side of the holding plate 10, and allows wiring lines to pass through the clearance hole. The plate-like leg portion 21a may have two or more clearance holes for wiring.

Figure 11:
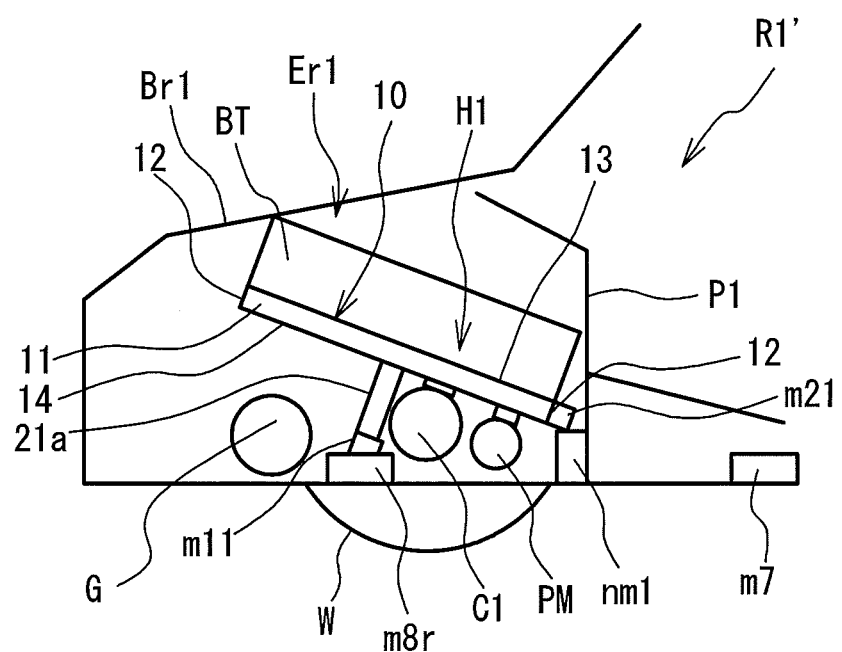
FIG. 11 is a schematic diagram illustrating a variation of the installation of the holding mechanism into a vehicle.

A description will next be given of a variation of the installation of the holding mechanism H1 into the vehicle. FIG. 11 is a schematic diagram illustrating a variation of the installation of the holding mechanism H1 into the vehicle. In this variation, instead of the fixing portion m1, a fixing portion m11 is mounted to the lower end of the leg portion 21a. The fixing portion m11 is mounted at a predetermined inclination angle to the leg portion 21a.

A new mount part nm1 is provided in the rear cross part of the front side member. The fixing portion m11 is fixed to the mount part m8r, and the fixing portion m21 is fixed to the new mount part nm1. This configuration allows the holding mechanism H1 to be installed in the engine room Er1 with the holding mechanism H1 inclined so that the short side 12 at the rear side of the vehicle is positioned lower than the short side 12 at the front side of the vehicle. As described above, the fixing portion m21 of the holding plate 10 is fixed to the front suspension member, which is a vehicle body structural member, via the new mount part nm1.

In the state illustrated in FIG. 11, the fixing portion m21 of the holding plate 10 is located higher than the fixing portion m11 of the leg portion 21a, but the fixing portion m21 does not have to be located higher than the fixing portion m11 in the state where the holding mechanism H1 is installed in the vehicle. That is to say, the fixing portion m21 is required to be located higher than the fixing portion m11 while the holding mechanism H1 takes a posture in which the holding plate 10 is in a substantial horizontal attitude and the leg portion 21a is positioned vertically lower than the holding plate 10. Therefore, in the state where the holding mechanism is installed in the vehicle, the third fixing portion is not necessarily located higher than the first or second fixing portion.

An outlet manifold for anode gas and an outlet manifold for cathode gas are located at the lower side toward which the fuel cell BT is inclined. This configuration allows the fuel cell BT to drain water. Since the holding plate 10 is inclined so that the front side of the vehicle is directed upward, the damage to the fuel cell BT is reduced when the front collision occurs.

As described above, the provision of the new mount part nm1 to the rear cross part of the front side member of an electric vehicle R1' allows the holding mechanism H1 to be installed with the holding mechanism H1 inclined as illustrated in FIG. 11. Even in this case, when any of the fixing portions m1 and m11 is mounted to the leg portion 21a, the holding mechanism H1 is installed in any of the electric vehicles F1 and R1'. The new mount part nm1 may be mounted to the lower side of the dash panel P1.

Figure 12:
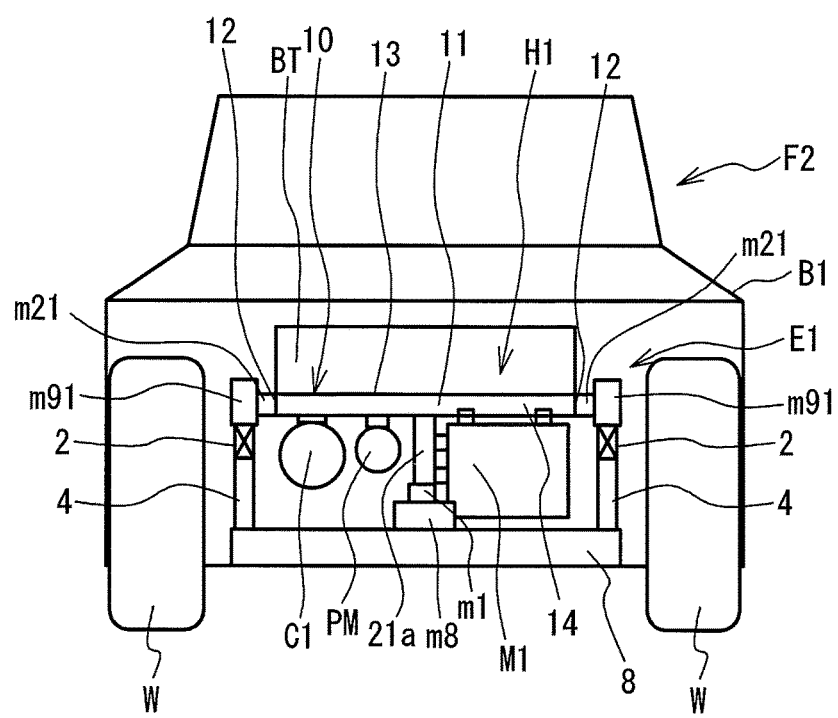
FIG. 12 is a schematic view of the inside of an engine room of an electric vehicle equipped with the holding mechanism.
Figure 13:
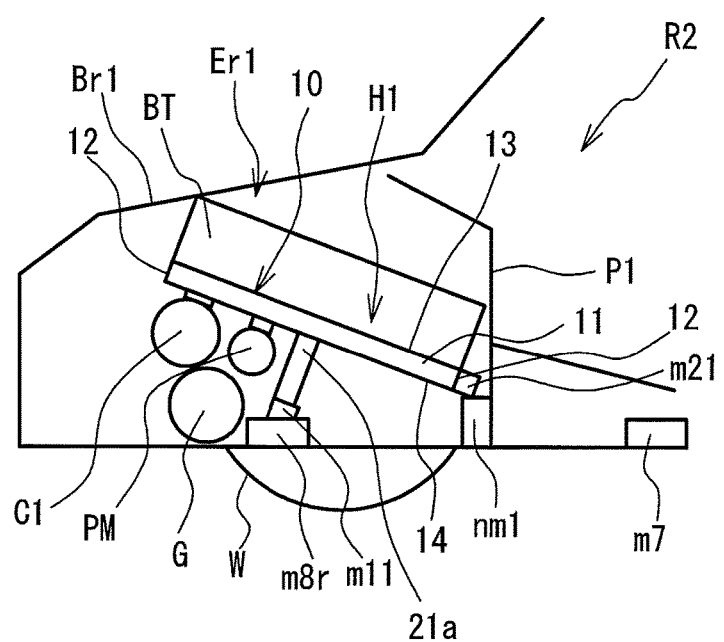
FIG. 13 is a schematic view of the inside of an engine room of an electric vehicle equipped with the holding mechanism.

A description will next be given of a variation of the mounting of electronic devices to the holding mechanism H1. FIG. 12 is a schematic view of the inside of the engine room E1 of an electric vehicle F2 equipped with the holding mechanism H1. FIG. 13 is a schematic view of the inside of the engine room Er1 of an electric vehicle R2 equipped with the holding mechanism H1.

As illustrated in FIG. 12, when viewed from the front of the electric vehicle F2, the motor M1 is held by the holding plate 10 of the holding mechanism H1 at the right side, and the air compressor C1 and the pump PM are held by the holding plate 10 of the holding mechanism H1 at the left side. Moreover, the air compressor C1 larger than the pump PM is located closer to the short side 12 of the holding plate 10 than the pump PM is. In consideration of the weight balance of the vehicle itself or the weight balance of the holding mechanism H1 holding two or more electronic devices, the positions of the motor M1, the air compressor C1, and the pump PM may be changed. Outlet manifolds for anode gas and cathode gas of the fuel cell BT are located at the motor M1 side.

In FIG. 13, the holding mechanism H1 is installed so that the air compressor C1 is located at the front side of the vehicle, and the outlet manifold of the fuel cell BT is located at the rear side of the vehicle. This configuration allows the fuel cell BT to drain water. Moreover, since the air compressor C1 and the pump PM are arranged at the front side of the vehicle, the air compressor C1 and the pump PM relax the impact and inhibit the break of the fuel cell BT during the head-on collision.

Figure 14:
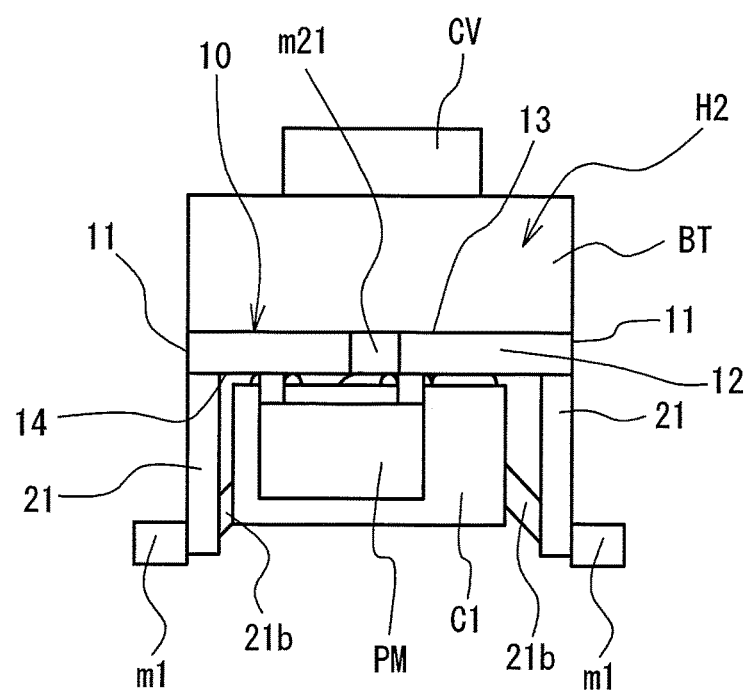
FIG. 14 is a schematic view of a holding mechanism of a variation of the second embodiment viewed from a longitudinal direction of a holding plate.

A description will next be given of a variation of the holding mechanism of the second embodiment. FIG. 14 is a schematic view of a holding mechanism H2 of a variation of the second embodiment viewed from the longitudinal direction of the holding plate 10. The holding mechanism H2 holds the fuel cell BT, and holds a converter CV on the fuel cell BT. The converter CV is a DC-DC converter that increases and outputs the voltage from the fuel cell BT. The converter CV has a rectangular shape when viewed from above. The longitudinal directions of the holding plate 10, the fuel cell BT, and the converter CV correspond to each other, and the short directions also correspond to each other. As described above, the electronic devices may be held at the upper surface 13 side of the holding plate 10.

Two thin plate-like reinforcing members 21b are fixed between the two leg portions 21 aligned in the short direction of the holding plate 10 and the lower surface 14 of the holding plate 10. More specifically, the lower end of the reinforcing member 21b is fixed to the lower end of the leg portion 21, and the upper end of the reinforcing member 21b is fixed to the center of the lower surface 14 of the holding plate 10. As described above, the reinforcing member 21b that reinforces the leg portion 21 may be provided. This configuration enables to pass wiring lines between the two leg portions 21 and to reinforce the leg portion 21.

Although some embodiments of the present invention have been described in detail, the present invention is not limited to the specific embodiments but may be varied or changed within the scope of the present invention as claimed.

An accessory supplied with electric power from the fuel cell BT may be a power control unit that controls electric power output from the converter CV to supply the electric power to the motor M or M1, or may be a pump that re-circulates anode off-gas or cathode off-gas to the fuel cell BT. The holding mechanism may hold a compressor for air-conditioning, or the like.

In a case of an electric vehicle, a secondary battery may be utilized instead of the fuel cell BT. In this case, the examples of the electronic device held by the holding mechanism include, but are not limited to, for example, a power control unit, and an air-cooling type or water-cooling type accessory that cools the secondary battery.

The shape of the leg portion is not limited to the shape described in the embodiments. The position relative to the holding plate, the direction, the shape, and the number of the leg portion are not limited to those of the above embodiments as long as the two fixing portions provided in the leg portion are separated from each other in the short direction of the holding plate.

What is claimed is:

1. A rear-drive electric vehicle comprising:
    a drive motor that drives a vehicle;
    a power source that supplies electric power to the drive motor;
    a holding plate that is arranged below the power source, holds the power source, and has an approximate rectangular shape;
    a leg portion that supports two long sides of the holding plate;
    first and second fixing portions that are provided in the leg portion, and are separated from each other in a short direction of the holding plate;
    a third fixing portion that is located at or near one of two sides of the holding plate along the short direction, and is located higher than the first and second fixing portions;
    a vehicle body structural member; and
    first and second mount parts and a third mount part provided in the vehicle body structural member;
    wherein the first and second mount parts are located away from each other in a width direction of the vehicle;
    the first and second fixing portions are respectively connected to the first and second mount parts, and
    the third fixing portion is connected to the third mount part.

2. The rear-drive electric vehicle according to claim 1, wherein
    the vehicle body structural member includes at least a front suspension member, and
    the first and second mount parts are provided in the front suspension member.

3. The rear-drive electric vehicle according to claim 2, wherein
    the vehicle body structural member further includes a dash panel or a front side member, and
    the third mount part is provided in the dash panel or the front side member.

* * * * *